United States Patent
Stirling et al.

(10) Patent No.: US 12,052,980 B1
(45) Date of Patent: Aug. 6, 2024

(54) FISHING ROD BUTT

(71) Applicants: James Stirling, Kalispell, MT (US); Matthew Povich, Kalispell, MT (US)

(72) Inventors: James Stirling, Kalispell, MT (US); Matthew Povich, Kalispell, MT (US)

(73) Assignee: Carbon Fishing, LLC, Big Fork (MT)

( * ) Notice: Subject to any disclaimer, the term of this patent is extended or adjusted under 35 U.S.C. 154(b) by 0 days.

(21) Appl. No.: 17/558,573

(22) Filed: Dec. 21, 2021

Related U.S. Application Data

(60) Provisional application No. 63/128,782, filed on Dec. 21, 2020.

(51) Int. Cl.
*A01K 87/08* (2006.01)
*A01K 87/02* (2006.01)

(52) U.S. Cl.
CPC .............. *A01K 87/08* (2013.01); *A01K 87/02* (2013.01)

(58) Field of Classification Search
CPC ........ A01K 87/08; A01K 87/02; A01K 87/00; Y10T 403/32245; Y10T 403/32368; G01B 3/56; B25G 1/102; B25J 1/02; B25J 1/00; B25J 1/04; B62B 5/064; F16M 11/2014; F41C 23/04; F41C 23/14; A47F 13/06; E04D 13/0765; E01H 2001/1293
USPC ........... 43/23, 18.1 CT, 18.1 R; 42/71.01, 73
See application file for complete search history.

(56) References Cited

U.S. PATENT DOCUMENTS

| | | | | |
|---|---|---|---|---|
| 2,000,263 A * | 5/1935 | Teetor | ..................... | A01K 87/06 43/23 |
| 4,955,141 A * | 9/1990 | Welch | ..................... | G01B 3/56 33/458 |
| 5,864,980 A * | 2/1999 | Lai | ..................... | A01K 87/08 43/18.1 CT |
| 7,533,484 B2 * | 5/2009 | Markley | ................ | A01K 87/04 43/18.1 R |
| 7,717,375 B2 * | 5/2010 | Chen | ..................... | F21V 21/26 248/125.7 |
| 2005/0072037 A1 * | 4/2005 | Markley | ................ | A01K 87/08 43/23 |
| 2006/0130388 A1 * | 6/2006 | Markley | ................ | A01K 91/02 43/18.1 R |
| 2006/0179705 A1 * | 8/2006 | Markley | ................ | A01K 87/08 43/18.1 R |
| 2006/0230669 A1 * | 10/2006 | Markley | ................ | A01K 87/08 43/25 |

(Continued)

*Primary Examiner* — Darren W Ark
*Assistant Examiner* — Katelyn T Truong
(74) *Attorney, Agent, or Firm* — J. Curtis Edmondson; Law Offices of J. Curtis Edmondson

(57) ABSTRACT

A fishing rod butt is provided with a first segment and a second segment and a hinge assembly coupled between the first segment and the second segment. The hinge assembly includes a first joint portion and a protrusion extending perpendicularly from the first joint portion. The protrusion includes a second joint portion forming a right angle between the first joint portion and the second joint portion. An angle-selector grip extends from the second joint portion of the protrusion into a cavity formed within a bottom side of the second segment. The angle selector-grip includes a locking pin pinhole in coaxial alignment with pinholes disposed on each side of the second segment. The first segment pivotally attaches to the second segment and the angle selector grip lockably repositions the first segment to the second segment via a locking pin.

12 Claims, 3 Drawing Sheets

(56) References Cited

U.S. PATENT DOCUMENTS

| | | | | |
|---|---|---|---|---|
| 2010/0251596 | A1* | 10/2010 | Malcarne | A01K 87/02 43/18.1 CT |
| 2011/0308027 | A1* | 12/2011 | Major | B05C 17/0205 15/145 |
| 2014/0068996 | A1* | 3/2014 | Steinhauser, Jr. | A01K 87/02 43/18.1 CT |
| 2015/0121741 | A1* | 5/2015 | Bowman | F41C 23/16 42/94 |
| 2016/0198688 | A1* | 7/2016 | Duda | A01K 87/06 43/20 |
| 2017/0157764 | A1* | 6/2017 | Ursell | G01B 3/56 |
| 2019/0152091 | A1* | 5/2019 | Ursell | G01B 3/56 |
| 2020/0344987 | A1* | 11/2020 | Malcarne | F16C 11/10 |
| 2022/0074702 | A1* | 3/2022 | Levi | F41C 23/04 |

\* cited by examiner

FISHING ROD BUTT

CROSS-REFERENCE TO RELATED APPLICATIONS

This application claims the benefit of U.S. Provisional Patent Application No. 63/128,782, filed Dec. 21, 2020, which is incorporated herein by reference in its entirety.

FIELD

The disclosure relates generally to fishing rod devices intended for use in big game fishing and more particularly, to a fishing rod butt.

BACKGROUND

Curved fishing rod butts or bent butts are used during big game fishing and with heavy drag settings on heavy tackle. A bent butt changes the angle of the tip section of the fishing rod, mainly when the rod is seated in a rod holder, a gimbal of a fighting chair, or a waist rod holder/harness. Bent butts help reduce significant strain on an angler's body during fish fighting and can be helpful for kids or small statured adults to sustain heavy drag without having, for example, to lean awkwardly forward to clear the corners of the boat transom and cleats.

Big game fishing rods can often be accessorized with a bent butt to replace the original straight butt; however, these bent butt accessories do not allow the angler to replace the straight butt with the bent butt during the act of fishing. Attempts have been made to provide fishing rod butts that have the capability of being used as a straight butt and adjustable for use as a bent butt while having a big game fish on the hook, but the angler is at risk at having the angler's fingers caught between the pivoting portions when operating the mechanisms that turn a straight butt into a bent butt. Accordingly, improvements are needed to eliminate the danger involved when using a single-unit, fishing rod butt capable of being interchangeably used as a straight butt or a bent butt while fish fighting.

SUMMARY

According to one aspect of the disclosure, the fishing rod butt includes a first segment and a second segment and a hinge assembly coupled between the first segment and the second segment. The hinge assembly includes a first joint portion and a protrusion extending perpendicularly from the first joint portion. The protrusion includes a second joint portion forming a right angle between the first joint portion and the second joint portion. An angle-selector grip extends from the second joint portion of the protrusion into a cavity formed within a bottom side of the second segment. The angle selector-grip includes a locking pin pinhole in coaxial alignment with pinholes disposed on each side of the second segment. The first segment pivotally attaches to the second segment and the angle selector grip lockably repositions the first segment to the second segment via a locking pin.

It should be understood that the summary above is provided to introduce in simplified form, a selection of examples that are further described in the detailed description. It is not meant to identify key or essential features of any claimed subject matter that may later claim priority to the present description. Furthermore, the scope of any such claimed subject matter would not be limited to implementations that solve any disadvantages noted above or contained herein.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present inventive subject matter. Moreover, in the drawings, like reference numerals designate corresponding parts throughout the several views.

DETAILED DESCRIPTION

Figure 1:
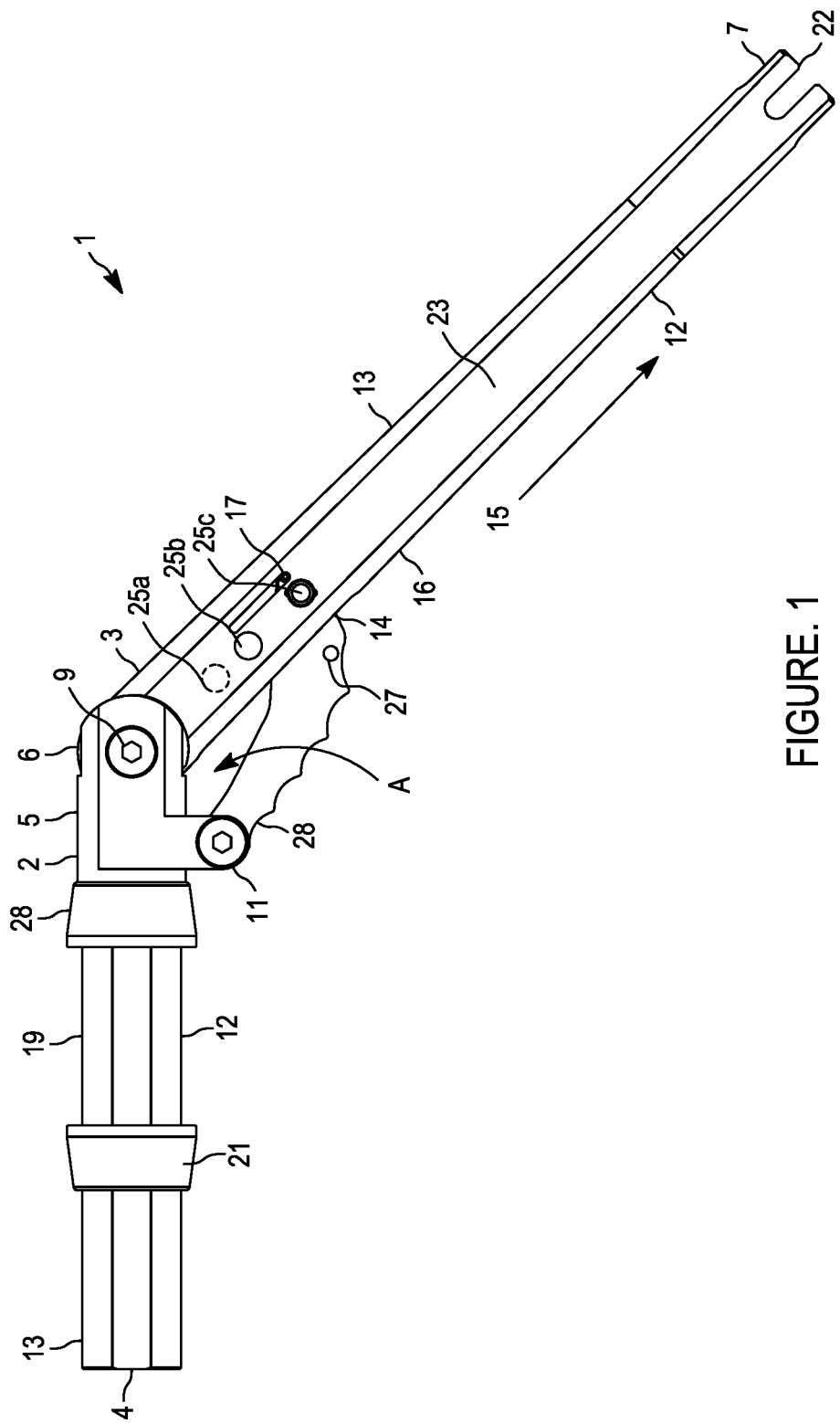
FIG. 1 is a left side view of an embodiment of a fishing rod butt.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, it is to be appreciated that the drawings may not be to scale.

Figure 2:
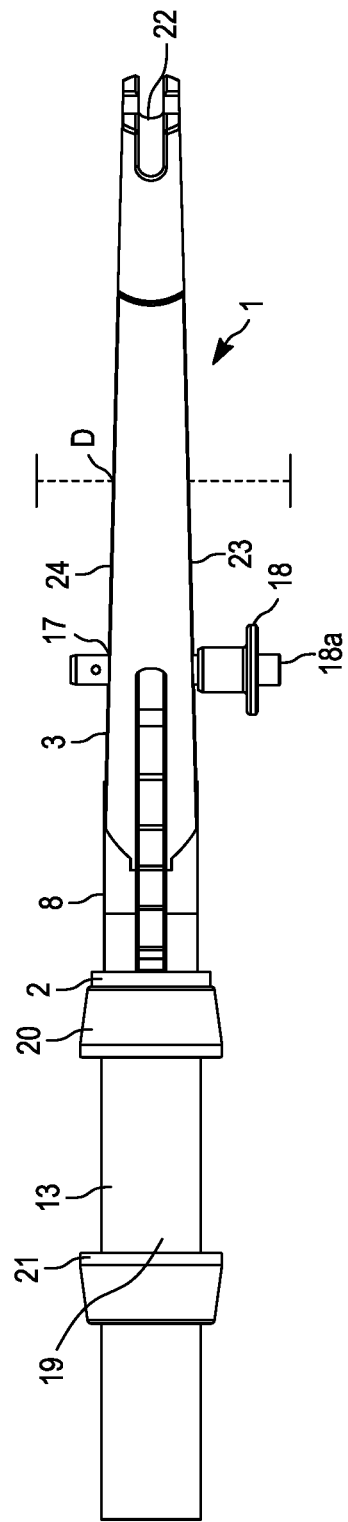
FIG. 2 is a top view of an embodiment of the fishing rod butt of FIG. 1.
Figure 3:
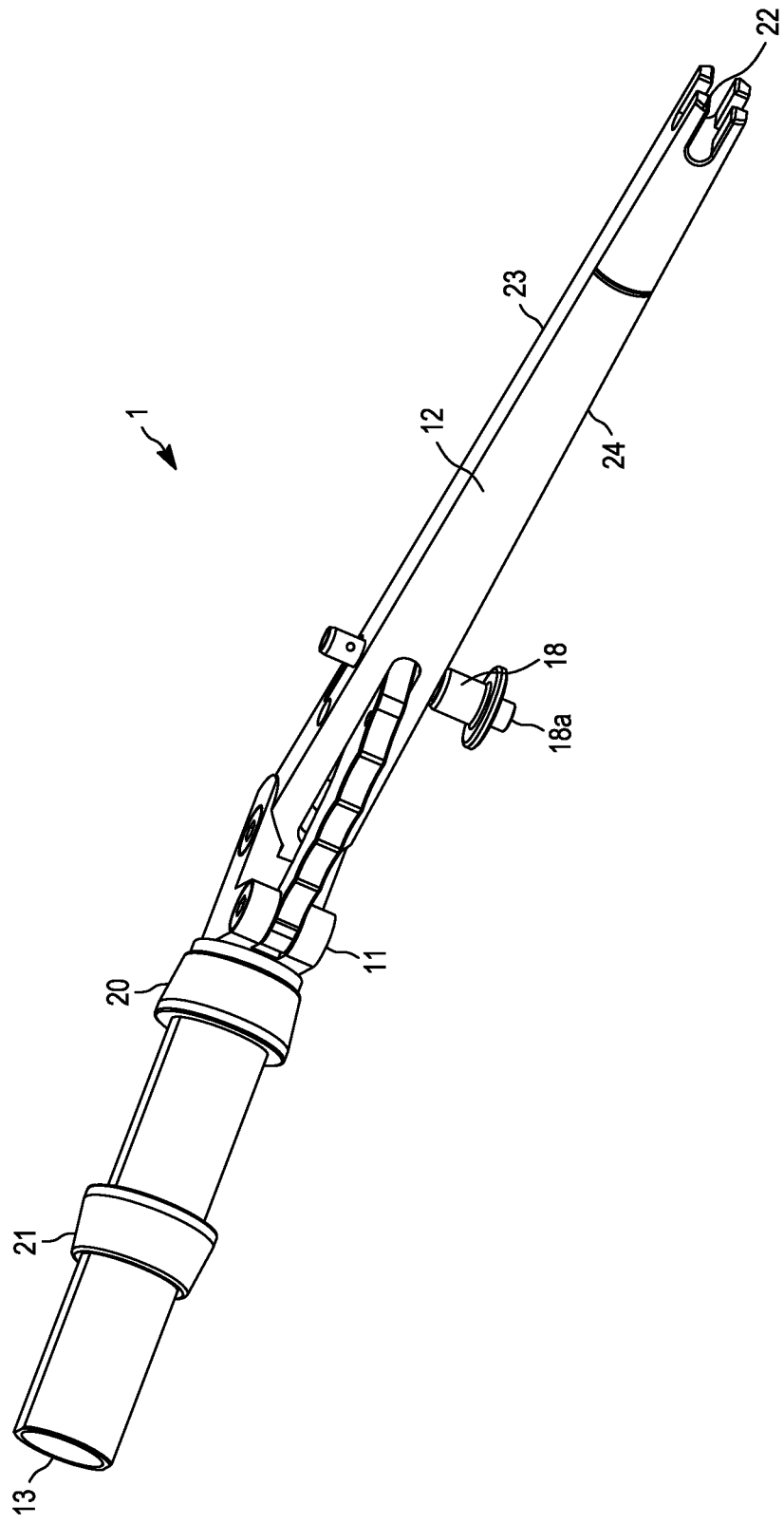
FIG. 3 is a left side, bottom perspective view of an embodiment of the fishing rod butt of FIG. 2.

The embodiments in this disclosure, as illustrated in FIGS. 1 through 3 and described in the text below, are utilized for big game fishing and high speed trolling by improving the presentation of the lure which results in more hook-ups and can reduce the physical strain on the angler when fighting the fish.

With reference primarily to FIG. 1, a fishing rod butt 1 is depicted. The fishing rod butt 1 includes a first segment 2 and a second segment 3 and a hinge assembly 8 coupled between the hinge-end 5 of the first segment 2 and the hinge-end 6 of the second segment 3. In a non-limiting embodiment of the fishing rod butt 1 and according to the principles of the present disclosure, the fishing rod butt 1 and the components of the fishing rod butt 1 can, but not necessarily, be formed or constructed or manufactured from a metal material, such as but not limited to aluminum, steel, or titanium-based materials, carbon fiber or other carbon-based materials, or alloys thereof. The examples of manufacturing materials of the fishing rod butt 1 are not intended to preclude embodiments which incorporate similar or equivalent materials, currently or prospectively available, that are sufficiently strong to handle big game fish drag and avoid corrosion in a marine environment.

With continuing reference primarily to FIG. 1, the hinge assembly 8 of the fishing rod butt 1 includes a first joint portion 9 and a protrusion 10. The protrusion 10 extends perpendicularly from the first joint portion 9 and includes a second joint portion 11 disposed at a right angle 4 in relation to one another.

An angle-selector grip 14 is disposed to extend in a substantially distal direction 15 from the second joint portion 11 of the protrusion 10 into a cavity 16 of the second segment 3. The cavity 16 is formed in the bottom side 12 of the second segment 2. The angle selector-grip 14 includes a locking pin pinhole 17 on an engagement end opposite from the second joint portion 11. The first segment 2 pivotally attaches to the second segment 3. The angle selector grip 14 lockably repositions the first segment 2 to the second segment 3 via the locking pin 18. The locking pin can, but not necessarily, employ a push-button release 18a.

With reference to FIG. 2 and continuing reference to FIG. 1, the first segment 2 of the fishing rod butt 1 includes a reel seat portion 19 formed between the fixed annular hood 20 disposed toward the hinge-end 5 and the threadably connected annular hood 21 disposed toward the rod blank-end 4. An orifice disposed in the rod blank-end 4 is adapted to receive the rod blank (not shown).

The second segment 3 of the fishing rod butt 1 includes a tapered diameter D from the joint-end 6 to the gimbal-end 7. A gimbal cross is disposed on the gimbal end 7; The first sidewall 23 and second sidewall 24 extending between the joint-end 6 and the gimbal-end 6 of the second segment 3 forming a flat-sided substantially oval shaped cylinder. The first sidewall 23 and the second sidewall 24 can be knurled to aid in the handling of the fishing rod butt 1.

A first set of pinholes 25a,b,c disposed through the first sidewall 23 and a second set of pinholes 26a,b,c disposed through the second sidewall 24 are in coaxial alignment together in combination in order to receive the locking pin 18 therethrough.

Referring to FIGS. 1-3, locking pin pinhole 17 of the angle-selector grip 14 slidingly sequences through the cavity 16 between the first set of pinholes 25a,b,c and the second set of pinholes 25a,b,c forming coaxial alignment therewith to receive the locking pin 18, thereby locking the first segment 2 relative to the second segment 3 in various angles.

The angle-selector grip 14 can, but not necessarily, include a leash hole 27, a leash (not shown), as well as curvilinear lines to form an ergonomic grip 28.

A pin 30 embedded through the angle selector-grip 14 at the engagement 31 end of the angle selector-grip 14 travels through a slit 29 during pivoting of the first segment 2 relative to the second segment 3. A trough 32 is formed on each side wall 23, 24 along the length of the slit 29 for catching the pin 30 as a bias during pivoting of the first segment 2 relative to the second segment 3.

The embodiments herein are not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It is understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, quadrants, thirds, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A fishing rod butt intended to be used with a fishing reel and fishing rod blank, comprising:
   a first segment and a second segment of the fishing rod butt, each of the first segment and the second segment in longitudinal alignment with one another; and
   a hinge assembly coupled between the first segment and the second segment, the hinge assembly including:
   a first joint portion;
   a protrusion extending perpendicularly from the first joint portion, the protrusion having a second joint portion forming a right angle on a bottom side of the fishing rod butt between the first joint portion and the second joint portion of the hinge assembly; and
   an angle-selector grip extending from the second joint portion of the protrusion into a cavity formed within a bottom side of the second segment, the angle selector-grip having a locking pin pinhole for receiving a locking pin on an engagement end opposite from the second joint portion,
   wherein the first segment pivotally attaches to the second segment via the first joint portion, and
   wherein the angle selector grip lockably repositions the first segment to the second segment via the locking pin.

2. The fishing rod butt of claim 1, wherein the first segment having a rod blank-end oppositely disposed from a hinge-end, the first segment comprising:
   a reel seat portion formed between a fixed annular hood, the fixed annular hood disposed proximally to the hinge assembly, and a threadably connected annular hood disposed
   toward the rod blank-end of the first segment and adjustable along the length of the first segment in relation to the fixed annular hood; and
   an orifice disposed in the rod-blank end to receive the rod blank.

3. The fishing rod butt of claim 2, wherein the second segment having a joint-end oppositely disposed from a gimbal-end, the second segment further comprising:
   a tapered diameter from the joint-end to the gimbal-end;
   a gimbal cross disposed on the gimbal-end;
   a first sidewall and a second sidewall extending between the joint-end to the gimbal-end of the second segment forming a flat-sided substantially oval shape therebetween;
   a first set of pinholes disposed through the first sidewall and a second set of pinholes disposed through the second sidewall, the first set of pinholes in coaxial alignment with the second set of pinholes, wherein a first pinhole of the first set of pinholes and a corresponding second pinhole of the second set of pinholes together in combination receive the locking pin therethrough.

4. The fishing rod butt of claim 3, wherein the second segment further comprising:
   a slit in which a pin embedded through the angle selector-grip at the engagement end of the angle selector-grip travels through during pivoting of the first segment relative to the second segment.

5. The fishing rod butt of claim 1, wherein the locking pin pinhole of the angle-selector grip engages longitudinally within the cavity passing between the first set of pinholes and the second set of pinholes to form coaxial alignment therewith and receive the locking pin.

6. The fishing rod butt of claim 5, wherein the locking pin as received through the first set of pinholes, the locking pin pinhole, and the second set of pinholes together in coaxial alignment, locks the first segment relative to the second segment in various angles during pivoting of the first segment relative to the second segment.

7. A method of making a fishing rod butt, comprising:
   forming a first segment and a second segment of the fishing rod butt, each of the first segment and the second segment in longitudinal alignment with one another; and
   coupling a hinge assembly between the first segment and the second segment, the hinge assembly including:
   a first joint portion;
   a protrusion extending perpendicularly from the first joint portion, the protrusion having a second joint portion forming a right angle on a bottom side of the fishing rod butt between the first joint portion and the second joint portion of the hinge assembly; and
   an angle-selector grip extending from the second joint portion of the protrusion into a cavity formed within a bottom side of the second segment, the angle selector-grip having a locking pin pinhole for receiving a locking pin on an engagement end opposite from the second joint portion,
   wherein the first segment pivotally attaches to the second segment via the first joint portion, and
   wherein the angle selector grip lockably repositions the first segment to the second segment via the locking pin.

8. The method of making a fishing rod butt of claim 7, wherein the first segment having a rod blank-end oppositely disposed from a hinge-end, the first segment comprising:
   a reel seat portion formed between a fixed annular hood, the fixed annular hood disposed proximally to the hinge assembly, and a threadably connected annular hood disposed toward the rod blank-end of the first segment and adjustable along the length of the first segment in relation to the fixed annular hood; and
   an orifice disposed in the rod-blank end to receive the rod blank.

9. The method of making a fishing rod butt of claim 8, wherein the second segment having a joint-end oppositely disposed from a gimbal-end, the second segment further comprising:
   a tapered diameter from the joint-end to the gimbal-end;
   a gimbal cross disposed on the gimbal-end;
   a first sidewall and a second sidewall extending between the joint-end to the gimbal-end of the second segment forming a flat-sided substantially oval shape therebetween;
   a first set of pinholes disposed through the first sidewall and a second set of pinholes disposed through the second sidewall, the first set of pinholes in coaxial alignment with the second set of pinholes, wherein a first pinhole of the first set of pinholes and a corresponding second pinhole of the second set of pinholes together in combination receive the locking pin therethrough.

10. The method of making a fishing rod butt of claim 9, wherein the second segment further comprising:
    a slit in which a pin embedded through the angle selector-grip at the engagement end of the angle selector-grip travels through during pivoting of the first segment relative to the second segment.

11. The method of making a fishing rod butt of claim 7, wherein the locking pin pinhole of the angle-selector grip engages longitudinally within the cavity passing between the first set of pinholes and the second set of pinholes to form coaxial alignment therewith and receive the locking pin.

12. The method of making a fishing rod butt of claim 11, wherein the locking pin as received through the first set of pinholes, the locking pin pinhole, and the second set of pinholes together in coaxial alignment, locks the first segment relative to the second segment in various angles during pivoting of the first segment relative to the second segment.

* * * * *